Patented Mar. 13, 1951

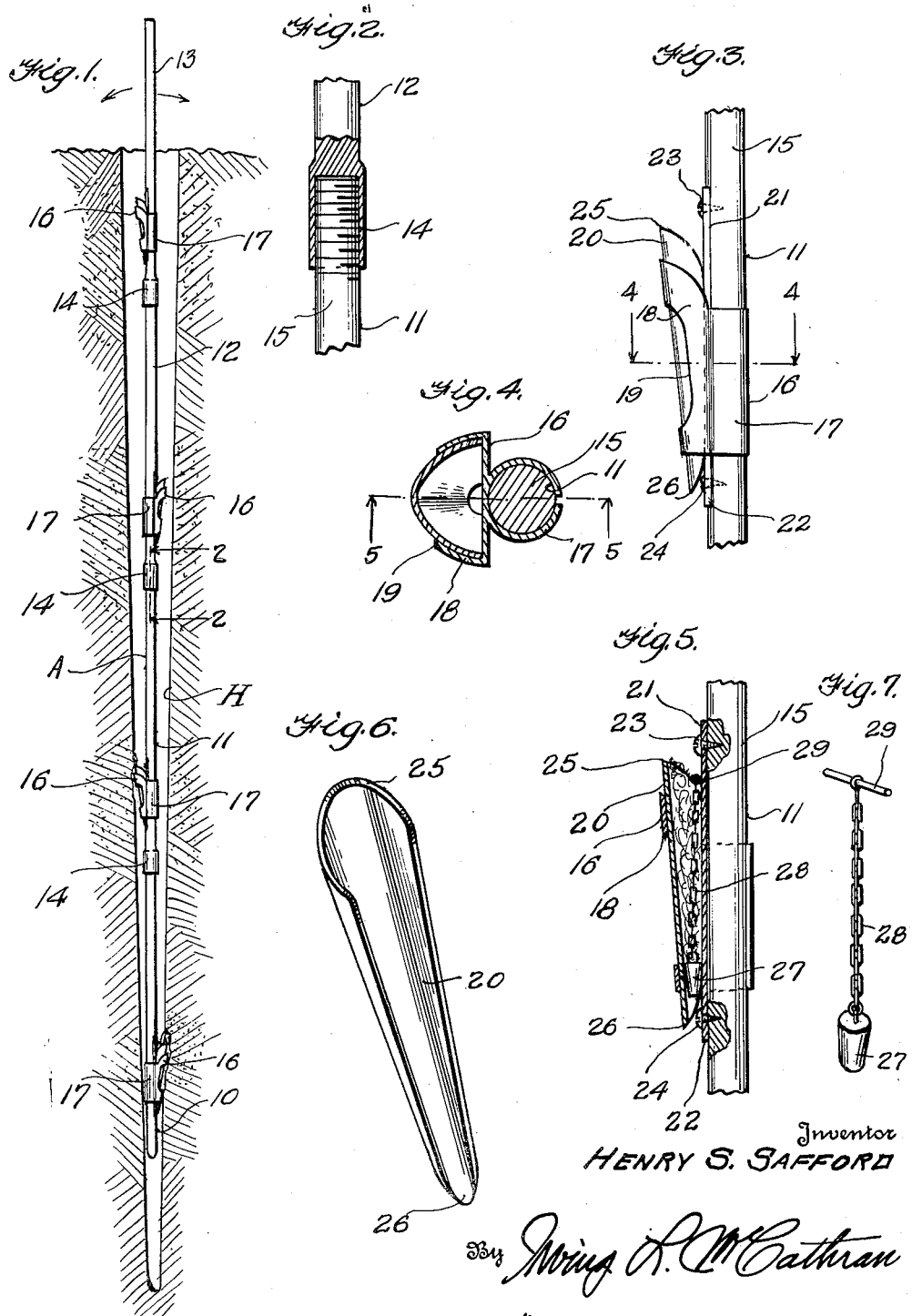

2,544,728

UNITED STATES PATENT OFFICE 2,544,728

MINERAL SAMPLING IMPLEMENT

Henry S. Safford, Little Rock, Ark.

Application January 7, 1949, Serial No. 69,705

6 Claims. (Cl. 73—425.2)

This invention relates to a mineral sampling implement, and has for one of its objects the production of a simple and efficient means for collecting samples of minerals from the side walls of a hole which has previously been drilled in the earth by a suitable drill.

A further object of this invention is the production of a simple and efficient implement which is provided with a plurality of mineral collecting cups for scraping or digging samples of minerals from the side walls of a hole which has been previously drilled in the earth by a suitable drill for the purpose of receiving said implement.

Other objects and advantages of the present invention will appear throughout the following specification and claims.

In the drawing:

Figure 1 is a side elevational view of the assembled mineral sampling implement shown within a drilled hole, the walls of the hole being shown in section;

Figure 2 is an enlarged vertical sectional view taken on line 2—2 of Figure 1;

Figure 3 is an enlarged side elevational view of a portion of the implement stem, showing one of the mineral sampling means also in side elevation;

Figure 4 is an enlarged transverse sectional view taken on line 4—4 of Figure 3;

Figure 5 is an enlarged sectional view taken on line 5—5 of Figure 4, a portion of the supporting stem being shown in side elevation;

Figure 6 is an enlarged perspective of a removable sampling scoop carried by each scoop support;

Figure 7 is a perspective view of the closure stopper which may be used to close the lower end of the scoop.

By referring to the drawing it will be seen that H designates a hole in the earth which has been drilled by a suitable drill prior to the insertion of a mineral sampling implement A therein. The hole H is preferably drilled by a tapering or needle-like drill such as is shown in my co-pending application entitled Earth Hand Drill, filed January 3, 1949, Serial Number 69,026.

My mineral sampling or material collecting implement A preferably comprises a bottom section 10, a lower intermediate section 11, an upper intermediate section 12, and a handle or top section 13. The sections are preferably of a uniform diameter and are provided with suitable threaded joint connections such as the joint connection 14 shown in detail in Figure 2. All sections are preferably similarly connected. Any suitable connection may be provided, however, without departing from the spirit of the invention.

Each section comprises a vertical stem 15 shown in detail in Figures 3 and 5, and each stem 15 carries a mineral sampling or collecting means comprising a scoop support 16, the scoop support carried by one section preferably extending from the opposite side relative to the scoop support 16 of the adjoining sections, or upon alternate opposite sides, as shown in Figure 1. Each scoop support comprises a stem encircling sleeve 17 which fits snugly around its supporting stem. Each scoop support also is provided with an inwardly inclined tapering elongated pocket 18 on one side of the sleeve 17, and preferably is provided with a cut-out portion 19 in its outer wall to eliminate unnecessary weight and to present only a minimum gripping surface for the removable scoop 20 which is carried in the pocket 18. This structure will facilitate the removal of the scoop from the pocket should the minerals collected tend to corrode the parts. The scoop support 16 carries anchoring ears 21 and 22 through which screws 23 and 24 respectively extend to anchor the scoop support to its supporting stem 15.

The scoop 20 comprises an open-sided elongated tapering body having a tapering open upper end 25 and a tapering lower end 26. The scoop 20 is supported in the scoop support 16 in each instance, in an outwardly and upwardly inclined position so that the operator may manipulate the implement so as to cause the open upper tapering end 25 to scratch or dig into the side wall of the hole H and thereby collect samples of mineral material which will fall into the scoop 20 and become wedged therein. By lifting the implement A from the hole H, the collected mineral material which has been collected in the various scoops may be inspected and labeled according to the position of the scoop relative to the other scoops of the implement. In this manner an operator may determine the approximate depth from the surface and location of any particular mineral which is indicated by the sample collected. The material may be dumped from the scoop merely by draining the scoop upwardly from the cut and emptying the material from the scoop in a conventional manner.

It should be noted that since the scoops are located at spaced intervals throughout the length of the implement A, samples of mineral material may be dug or scratched from the wall of the hole H at different elevations to accurately determine the advisability of proceeding further with excavations.

It should be understood that certain detail changes may be made in the structure of the cups and their locations without departing from the spirit of the invention, so long as these changes fall within the scope of the appended claims.

Should it be necessary or desirable to close the lower end 26 of the scoop 20, a closure stopper 27 may be used to close the bottom of the scoop 20. This stopper 27 is connected to a chain 28 which extends longitudinally of the scoop 20, as shown in Figure 5. A handle or shaft 29 is secured to the upper end of the chain 28 and is adapted to span the upper end 25 of the scoop 20 to suspend the chain 28. The stopper 27 may be released from the lower end of the scoop 20 for emptying the scoop 20 merely by pulling upwardly upon the staff or handle 29 and chain 28. It should be understood that the stopper structure is only used when it is necessary to close the lower end of the scoop 20.

Having described the invention, what is claimed as new is:

1. A mineral material sampling implement comprising an elongated stem, a plurality of scoop supports carried by said stem, a removable scoop carried by each support and adapted to scrape samples of material from the wall of a hole into which said implement is inserted.

2. A mineral material sampling implement comprising an elongated stem, a plurality of scoop supports carried by said stem, a removable scoop fitted in each support and adapted to scrape samples of material from the wall of a hole into which said implement is inserted, and each scoop having a tapering upper scraping end.

3. A mineral material sampling implement comprising an elongated stem, a scoop support carried thereby, said support having a stem engaging portion and a tapering scoop receiving pocket extending laterally of the stem engaging portion, and a removable tapering material collecting scoop carried by said tapering scoop retaining pocket.

4. A mineral material sampling implement comprising an elongated stem, a scoop support carried thereby, said scoop support having a stem encircling portion and a tapering scoop receiving pocket extending laterally of the stem encircling portion, a removable tapering material collecting scoop carried by said tapering scoop receiving pocket, and said scoop receiving pocket having an open upper end through which said scoop extends.

5. A mineral material sampling implement comprising a stem, a scoop carried by the stem and having a scraping edge at one end for collecting material in the scoop, said scoop having an open lower end, and a removable stopper closing said open lower end.

6. A mineral material sampling implement comprising a stem, a scoop carried by the stem and having a scraping edge at one end for collecting material in the scoop, said scoop having an open lower end, a removable stopper closing said open lower end, and means extending longitudinally of the scoop for facilitating the removal of said stopper from said open lower end.

HENRY S. SAFFORD.

REFERENCES CITED

The following references are of record in the file of this patent:

UNITED STATES PATENTS

| Number | Name | Date |
| --- | --- | --- |
| 233,202 | Cheney | Oct. 12, 1880 |
| 1,354,016 | Boerher et al. | Sept. 28, 1920 |
| 1,539,229 | Akeyson | May 26, 1925 |
| 1,790,387 | Monroe | Jan. 27, 1931 |
| 1,871,328 | Kunz | Aug. 9, 1932 |
| 2,053,698 | Church | Sept. 8, 1936 |
| 2,055,648 | Brack | Sept. 29, 1936 |

FOREIGN PATENTS

| Number | Country | Date |
| --- | --- | --- |
| 127,121 | Germany | Jan. 14, 1902 |
| 358,855 | Italy | Mar. 4, 1938 |